United States Patent [19]

Blach

[11] Patent Number: 5,092,191
[45] Date of Patent: Mar. 3, 1992

[54] WORM SHAFT MACHINE WITH COMPOSITE HOUSING

[76] Inventor: Josef Blach, Wilhelmstr. 24, 7144 Asperg, Fed. Rep. of Germany

[21] Appl. No.: 605,119

[22] Filed: Oct. 26, 1990

[30] Foreign Application Priority Data

Oct. 30, 1989 [DE] Fed. Rep. of Germany ....... 3936085

[51] Int. Cl.⁵ .............................................. F16H 1/20
[52] U.S. Cl. .................................. 74/424.7; 464/170; 418/200
[58] Field of Search .......................... 74/424.5, 424.7; 198/663, 860.1, 657, 658; 464/170, 177; 418/60, 200, 213

[56] References Cited

U.S. PATENT DOCUMENTS

| | | | |
|---|---|---|---|
| 750,532 | 1/1904 | George | 418/200 X |
| 910,272 | 1/1909 | Cleveland | 418/200 X |
| 2,533,320 | 12/1950 | Hull et al. | 418/200 X |
| 2,653,581 | 9/1953 | Schubert | 418/213 |
| 2,714,857 | 8/1955 | Albright et al. | 418/200 X |
| 3,101,673 | 8/1963 | Clark et al. | 418/200 X |
| 4,656,884 | 4/1987 | Nemoto | 74/424.5 |

FOREIGN PATENT DOCUMENTS

| | | |
|---|---|---|
| 2500883 | 7/1976 | Fed. Rep. of Germany . |
| 3347537 | 9/1985 | Fed. Rep. of Germany . |
| 820620 | 11/1937 | France ................................ 418/200 |

*Primary Examiner*—Allan D. Herrmann
*Assistant Examiner*—Julie Krolikowski
*Attorney, Agent, or Firm*—Michael J. Striker

[57] ABSTRACT

A worm shaft machine comprises having a longitudinal direction and composed of a plurality of housing portions located near one another in the longitudinal direction, the housing portions having a substantially rectangular outer contour and being provided with longitudinal openings for receiving a worm, the housing portions being assembled with one another so that they abut against one another in the longitudinal diection, a plurality of tensioning rods which tension the housing portions with one another, a closed frame provided at each end of each of the housing portions and forming a pressing piece, the frames having small sides on which they are horizontally exactly slidingly supported.

9 Claims, 2 Drawing Sheets

WORM SHAFT MACHINE WITH COMPOSITE HOUSING

BACKGROUND OF THE INVENTION

The present invention relates to a worm shaft machine. More particularly it relates to a worm shaft machine with a housing composed of a plurality of housing portions arranged near one another in the longitudinal direction, wherein the housing portions have a substantially rectangular cross-section and provided in their interior with longitudinal openings for receiving a worm gear.

Such worm shaft machines are known in the art. One of such machines is disclosed, for example, in German document DE-a-347,537. The housing of the known worm shaft machines is composed of a plurality of individual parts and is costly to manufacture. For many applications of such a worm shaft machine this expensive construction is not required.

In the known worm shaft machine the inner housing formed as a wear resistant insert is under high mechanical pretensioning over its total length. For many applications this is however not required since the highest mechanical loads occur in a housing portion of the assembled housing at the ends of the housing portion.

SUMMARY OF THE INVENTION

Accordingly, it is an object of the present invention to provide a worm shaft machine of the above mentioned general type, which avoids the disadvantages of the prior art.

More particularly, it is an object of the present invention to provide a worm shaft machine of the above mentioned type which is composed of a minimum number of individual parts with simple geometrical construction, so that a simple and cost favorable manufacturing and mounting can be achieved.

It is also an object of the present invention to provide such a worm shaft machine which has a controllable operation due to the straightness of the axes, or in other words straight guidance of the worm shafts in the housing of the machine.

In keeping with these objects and with others which will become apparent hereinafter, one feature of the present invention resides, briefly stated, in a worm shaft machine in which all housing portions are arranged in a longitudinal direction in abutment against one another in a flush manner and tensioned by several tensioning rods, a closed frame is arranged at each end of the housing portion and fitted as a pressing piece on the side of the housing portion, and the frames at their small sides are exactly horizontally supported in a sliding manner.

When the worm shaft machine is designed in accordance with the present invention, it eliminates the disadvantages of the prior art and achieves the above mentioned objects. The net housing of the inventive worm shaft machine includes a plurality of individual parts with a simple construction and inexpensive to manufacture. The parts provided for the pressure assembly of the housing also have an uncomplicated construction and such dimensions that they can be mounted only where they are required. Therefore, an efficient construction of the housing is achieved.

In accordance with another feature of the present invention, square or rectangular holes are provided in the corners of the housing portions.

Still another feature of the present invention is that on the small sides of the housing portion and the small sides of the frame opening in the region of a central line extending parallel to the wide-side outer edge, a plurality of grooves are formed in alignment with one another, and wedges are received in the grooves.

Still another feature of the present invention is that a plurality of grooves are formed at the borders of the housing portions on the wide sides of the frame opening in the region of a central line extending parallel to a small-side outer edge of the housing portion, and clamping pins are provided in the grooves.

Still a further feature of the present invention is that both outer edges of the frame in the region of a central line which is parallel to the wide-side outer edge are provided with sliding blocks.

Each sliding block can be supported on a further sliding block arranged at the end of a leg of a support.

The sliding blocks can be overlapped by a clamp mounted on the support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
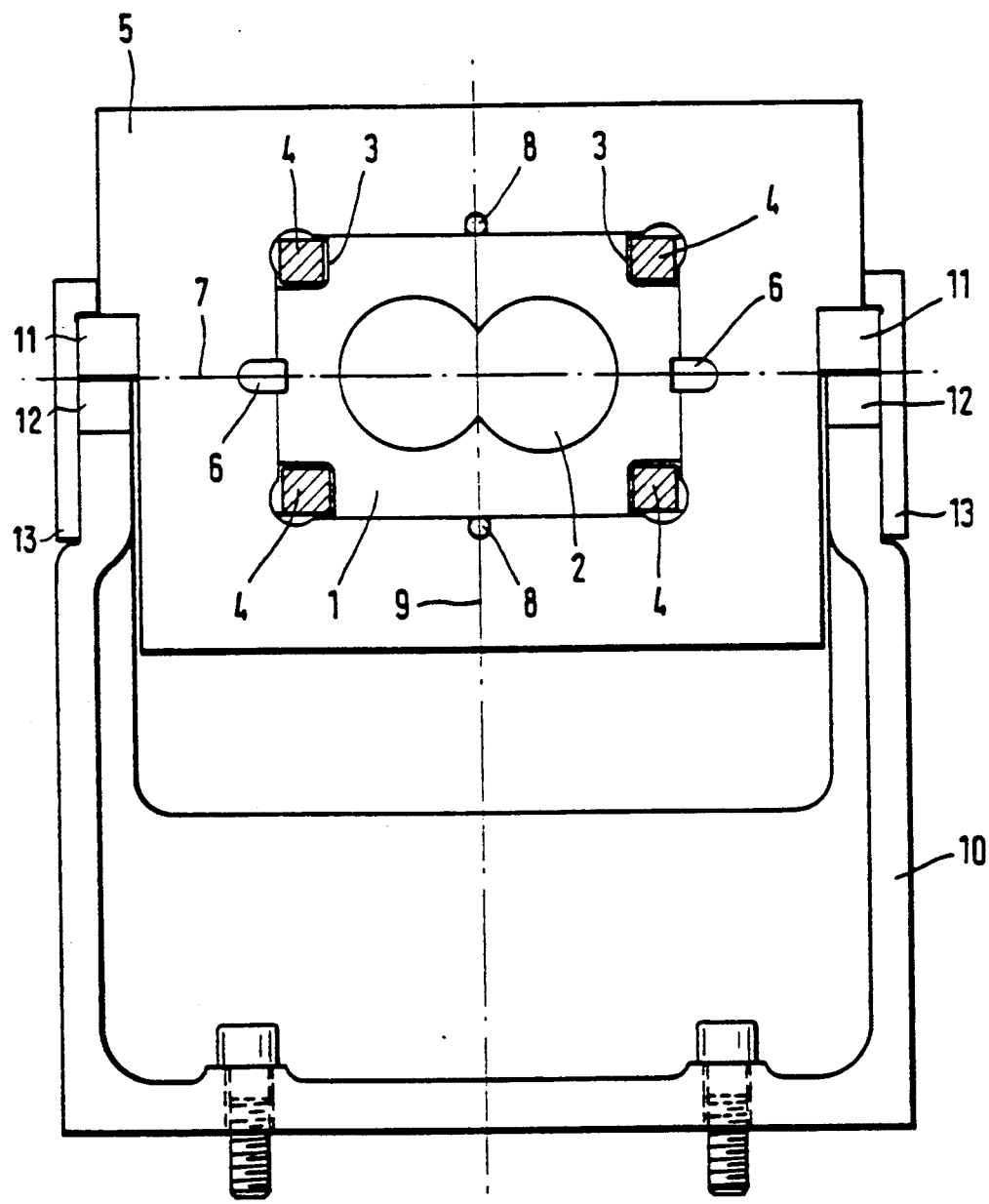
FIG. 1 is a view showing a section of a worm shaft machine in accordance with the present invention shown in FIG. 2 taken along the line I—I.

As can be seen from FIG. 1 the machine in accordance with the present invention has a housing portion 1 having a substantially rectangular cross-section. The housing portion 1 has two parallel longitudinal openings 2 which overlap one another. The number of longitudinal openings 2 makes clear that the housing is designed for a double worm shaft machine. The longitudinal openings in the interior of the housing can be formed differently also. The housing portion 1 can be composed completely of a wear resistant material. It is also possible that the inner contour surface of the housing portion is provided only with a coating layer of a wear resistant material, or a wear resistant insert is arranged inside the housing portion.

The housing portions 1 which together form the housing are assembled so that their end surfaces abut against one another in a flush manner. The corners of the housing portions 1 have holes which are formed in the embodiment of FIG. 1 as square holes. Tension rods 4 are arranged in the holes 3 and have a length which is greater than the length of the assembled housing portions 1. The tension rods 4 connect the housing portions with one another in a force-transmitting manner and simultaneously apply a mechanical pre-tensioning in the axial direction of the housing to the housing portions. The exact axial orientation of the housing portions can be obtained in that one end side of the housing portion can be provided with not shown lined holes while the other end side of the housing portion can be provided with not shown alignment pins which are in alignment with the lined holes.

Before assembling the housing portions to form a housing, a closed frame 5 is fitted on each end of the housing portion. A mechanical tensioning on the ends of the housing portion is applied by the frame 5 in the following manner: In the horizontal direction by the wedge 6 which are arranged in corresponding grooves in the housing portion and in the frame 5. These grooves lie on a center line 7 which is parallel to the wide-side outer edge of the frame 5. In the vertical direction the mechanical tensioning is obtained by clamping pins 8. The clamping pins 8 are also guided in the frame 5. The pins 8 have substantially circular cross-section. They have however a wedge-shaped cross-section in the longitudinal direction, so that their outer surface is grinded out in a wedge-shaped manner at one side. The grooves for the clamping pins 8 lie on a center line 9 which is parallel to the small-side outer edge of the housing portion.

The housing composed of the housing portions 1 is supported on several supports 10 in that the frames are laterally provided with sliding blocks 11 which are supported on sliding blocks 12 on the support 10. This type of support insures a free movement between the housing and the frames in the longitudinal direction of the worm shaft machine. A clamp 13 mounted on the frame 10 engages the sliding blocks 11 and 12 and prevents a vertical lifting of the housing.

Figure 2:
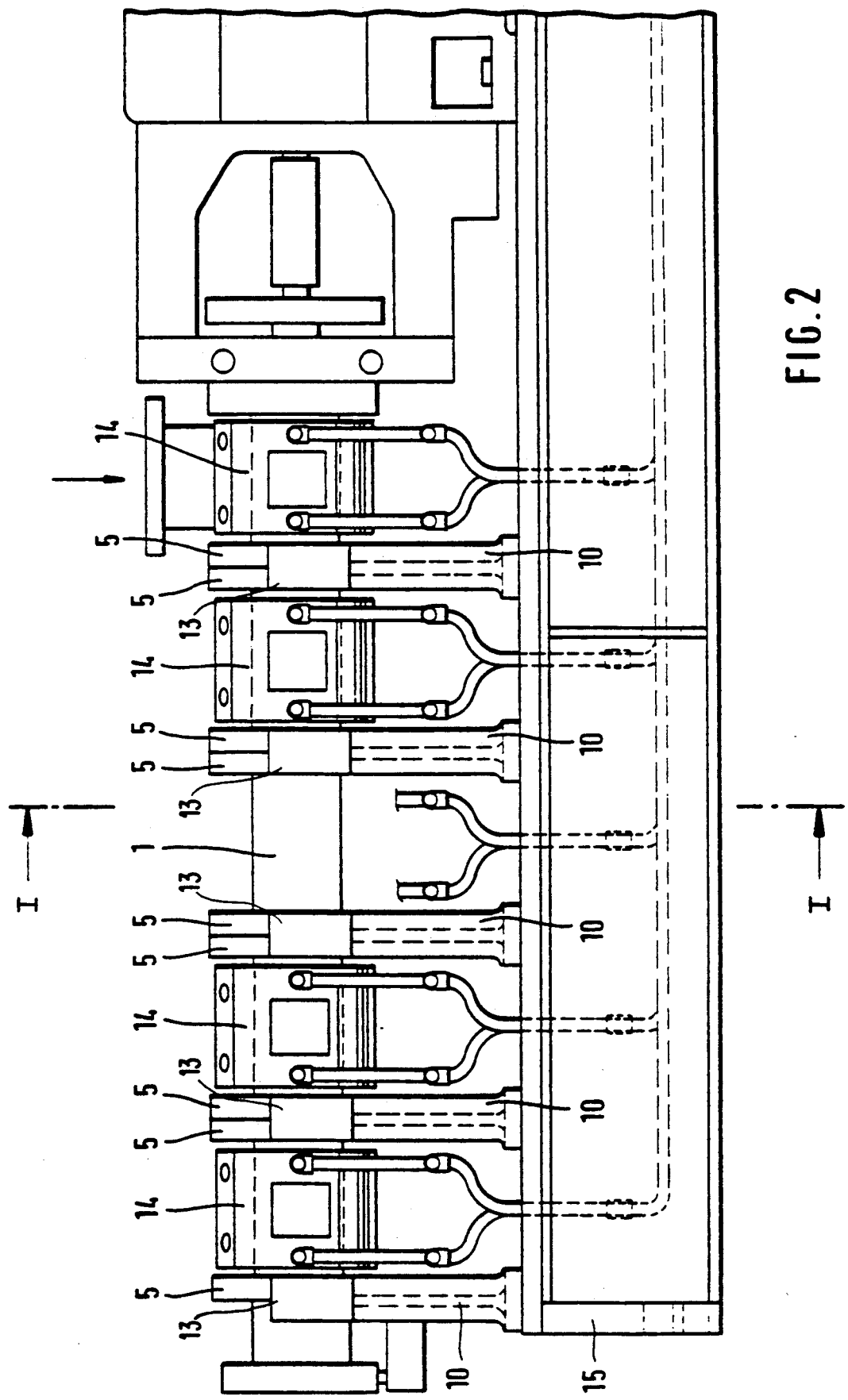
FIG. 2 is a side view of the assembled worm shaft machine in accordance with the present invention.

FIG. 2 shows more or less schematically the whole worm shaft machine. The supports 10 and the frames 5 are clearly shown in this Figure. The greater part of the housing portions 1 are covered with heating devices 14 which surround them. In the center part of the worm shaft machine the heating device is not provided, so that the housing portions 1 can be observed. The supports 10 are mounted on a bottom frame 15.

It will be understood that each of the elements described above, or two or more together, may also find a useful application in other types of constructions differing from the types described above.

While the invention has been illustrated and described as embodied in a worm shaft machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A worm shaft machine, comprising having a longitudinal direction and composed of a plurality of housing portions located near one another in said longitudinal direction, said housing portions having a substantially rectangular outer contour and being provided with longitudinal openings for receiving a worm, said housing portions being assembled with one another so that they abut against one another in said longitudinal direction; a plurality of tensioning rods which extend through the housing portions and tension the housing portions with one another; a closed frame provided at each end of each of said housing portions and forming a pressing piece, said frames having small sides on which they are horizontally exactly slidingly supported.

2. A worm shaft machine as defined in claim 1, wherein each of said housing portions has a plurality of corners and is provided with recesses in said corners.

3. A worm shaft machine as defined in claim 2, wherein said recesses are square.

4. A worm shaft machine as defined in claim 2, wherein said recesses are rectangular.

5. A worm shaft machine as defined in claim 1, wherein said housing portions have a wide side and an outer edge at said wide side; and further comprising grooves arranged in alignment with one another and provided on said small sides of said housing portions and small sides of an opening of said frame in the region of a central line extending parallel to said outer edge of said wide side; and a plurality of wedges received in said grooves.

6. A worm shaft machine as defined in claim 1, wherein said housing portions have grooves provides on wide sides of an opening of said frames on a center line extending parallel to small-side outer edges of said housing portions; and further comprising a plurality of clamping pins received in said grooves.

7. A worm shaft machine as defined in claim 1; and further comprising sliding blocks arranged on both outer edges of said frame in the region of a center line which extends parallel to wide-side outer edges.

8. A worm shaft machine as defined in claim 1; and further comprising a support having a leg with an end; a plurality of first sliding blocks slidingly supporting said frame; and a plurality of second, sliding blocks supported on said end of said leg of said support, each of said first sliding blocks being supported on a respective one of said second sliding blocks.

9. A worm shaft machine as defined in claim 8; and further comprising a clamp mounted on said frame and surrounding said sliding blocks from outside.

* * * * *